(12) United States Patent
Gruber et al.

(10) Patent No.: US 12,442,389 B1
(45) Date of Patent: Oct. 14, 2025

(54) MILL SPINDLE FAN

(71) Applicant: GM GLOBAL TECHNOLOGY OPERATIONS LLC, Detroit, MI (US)

(72) Inventors: Colton Gruber, Royal Oak, MI (US); Donald C. Grzebienik, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/753,294

(22) Filed: Jun. 25, 2024

(51) Int. Cl.
  *F04D 29/38* (2006.01)
  *B23Q 3/12* (2006.01)
  *F04D 29/34* (2006.01)

(52) U.S. Cl.
  CPC ............. *F04D 29/388* (2013.01); *B23Q 3/12* (2013.01); *F04D 29/34* (2013.01)

(58) Field of Classification Search
  CPC ......... F04D 29/388; F04D 29/34; B23Q 3/12; B23Q 11/127; B24B 23/00; B24B 55/10; E01C 23/088; H02K 7/145
  See application file for complete search history.

(56) References Cited

U.S. PATENT DOCUMENTS

| | | | | |
|---|---|---|---|---|
| 1,173,908 A * | 2/1916 | Wills | ............... | B64C 29/0033 416/149 |
| 2,257,849 A * | 10/1941 | Martellotti | ........... | B23Q 11/127 451/7 |
| 2,368,888 A * | 2/1945 | Schumann | ............. | H02K 7/145 464/900 |
| 2,779,883 A * | 1/1957 | Schumann | ............. | H02K 7/145 310/90 |
| 4,133,230 A * | 1/1979 | Inaba | ................... | B23Q 11/127 82/900 |
| 4,557,738 A * | 12/1985 | Menasian | .......... | B01D 46/4227 55/300 |
| 5,772,367 A | 6/1998 | Daniel | | |
| 9,156,153 B2 * | 10/2015 | Dvorak | ................ | B23Q 11/005 |
| 10,044,245 B2 * | 8/2018 | Bekavac | ................ | B25F 5/008 |
| 2008/0028568 A1 * | 2/2008 | Tiede | ................... | B24B 55/102 15/329 |
| 2009/0104860 A1 * | 4/2009 | Stierle | .................... | B24B 23/02 451/344 |
| 2015/0379897 A1 * | 12/2015 | Nadig | .................... | H02K 1/276 310/1 |
| 2017/0341115 A1 * | 11/2017 | Noll | ........................ | B08B 5/02 |
| 2023/0201985 A1 | 6/2023 | Butschan | | |

FOREIGN PATENT DOCUMENTS

| | | |
|---|---|---|
| CN | 110465807 A | 11/2019 |
| DE | 202015004924 U1 | 8/2015 |
| EP | 1872901 A1 | 1/2008 |
| EP | 2422925 A1 | 2/2012 |

* cited by examiner

*Primary Examiner* — Eric J Zamora Alvarez
(74) *Attorney, Agent, or Firm* — Quinn IP Law

(57) ABSTRACT

A mill fan includes fan blades having a radially inner end and a radially outer end and an attachment sleeve having a radially inner surface and a radially outer surface. The radially inner surface includes a tool contact surface and the radially outer surface is in engagement with the radially inner ends of the fan blades. Them mill fan also includes an outer sleeve connecting the radially outer ends of the fan blades that forms a ring.

20 Claims, 3 Drawing Sheets

MILL SPINDLE FAN

The present disclosure relates to the field of machining and, more specifically, to a milling machine having a fan for removing debris.

Milling machines are widely used in various industries for shaping and cutting materials, such as metals, plastics, and composites. These machines typically employ a rotating cutting tool, known as a milling cutter, to remove material from a workpiece. The workpiece is securely fastened to a table. The table may move relative to the milling cutter, or the milling cutter may move relative to the table to allow for precise positioning and feeding of the workpiece into the cutting tool. For some milling machines, movement of the milling cutter relative to the workpiece may be controlled manually by an operator or with computer numerical control ("CNC").

Depending on the type of workpiece being machined, cutting fluid may be applied to the milling tool and work piece to reduce friction and heat generated during the machining process. Furthermore, for some workpiece materials a vacuum source may be used to collect debris as it is formed form the milling cutter.

SUMMARY

Disclosed herein is a mill fan. The mill fan includes fan blades having a radially inner end and a radially outer end and an attachment sleeve having a radially inner surface and a radially outer surface. The radially inner surface includes a tool contact surface and the radially outer surface is in engagement with the radially inner ends of the fan blades. Them mill fan also includes an outer sleeve connecting the radially outer ends of the fan blades that forms a ring.

In one aspect of the disclosure the outer sleeve includes a conical shape.

In one aspect of the disclosure the radially inner end of each of the fan blades is clocked relative to a corresponding one of the radially outer ends of the fan blades.

In one aspect of the disclosure the plurality of fan blades include a radially inner chord length adjacent the radially inner end of each of the fan blades that is less than a radially chord length adjacent the radially outer end of each of the fan blades.

In one aspect of the disclosure the attachment sleeve extends a first axial length relative to an axis of rotation of the mill fan and the outer sleeve extends a second axial length relative to the axis of rotation of the mill fan with the second axial length being greater than the first axial length.

In one aspect of the disclosure the attachment sleeve is partially axially offset from the outer sleeve relative to an axis of rotation of the mill fan.

In one aspect of the disclosure the attachment sleeve is at least partially offset from the outer sleeve by at least 50% of an axial length of the attachment sleeve.

In one aspect of the disclosure the radially inner end of each of the fan blades are axially offset outward from an axial end of the outer sleeve relative to an axis of rotation of the mill fan.

In one aspect of the disclosure the radially outer end of each of the fan blades are axially offset outward from an axial end of the attachment sleeve relative to an axis of rotation of the mill fan.

In one aspect of the disclosure the attachment sleeve includes a fastener opening for accepting a fastener and the fastener opening is located axially outward from an axial end of the outer sleeve relative to an axis of rotation of the mill fan.

Disclosed herein is a milling machine. The milling machine includes a drive motor in driving engagement with a spindle, a tool attached to the spindle and configured to rotate with the spindle and a mill fan attached to the tool and configured to rotate with the tool. The mill fan includes fan blades having a radially inner end and a radially outer end and an attachment sleeve having a radially inner surface and a radially outer surface. The radially inner surface includes a tool contact surface and the radially outer surface is in engagement with the radially inner ends of the fan blades. The mill fan also includes an outer sleeve connecting the radially outer ends of the fan blades that forms a ring.

In one aspect of the disclosure the outer sleeve includes a conical shape.

In one aspect of the disclosure the radially inner end of each of the fan blades is clocked relative to a corresponding one of the radially outer ends of the fan blades.

In one aspect of the disclosure the fan blades include a radially inner chord length adjacent the radially inner end of each of the fan blades that is less than a radially chord length adjacent the radially outer end of each of the fan blades.

In one aspect of the disclosure the attachment sleeve extends a first axial length relative to an axis of rotation of the mill fan and the outer sleeve extends a second axial length relative to the axis of rotation of the mill fan with the second axial length being greater than the first axial length.

In one aspect of the disclosure the attachment sleeve is partially axially offset from the outer sleeve relative to an axis of rotation of the mill fan.

In one aspect of the disclosure the attachment sleeve includes a fastener opening for accepting a fastener and the fastener opening is located axially outward from an axial end of the outer sleeve relative to an axis of rotation of the mill fan.

Disclosed herein is a method of operating a milling machine to form a workpiece. The method includes receiving a tool path representative of a component with a controller and directing a tool to engage and selectively remove material from the workpiece while following the tool path. The method also includes generating an airflow with a mill fan in a region of intersection of the tool and the workpiece to clear debris from the tool path by selecting a rotational speed for the tool based on a material of the workpiece and a feed rate of the tool. The mill fan includes fan blades and an attachment sleeve having a radially inner surface and a radially outer surface with the radially inner surface having a tool attachment surface in direct contact with the tool and radially inner ends of the fan blades extend radially outward from the radially outer surface of the attachment sleeve. The mill fan also includes an outer sleeve connecting distal ends of the fan blades that form a ring.

Figure 1:
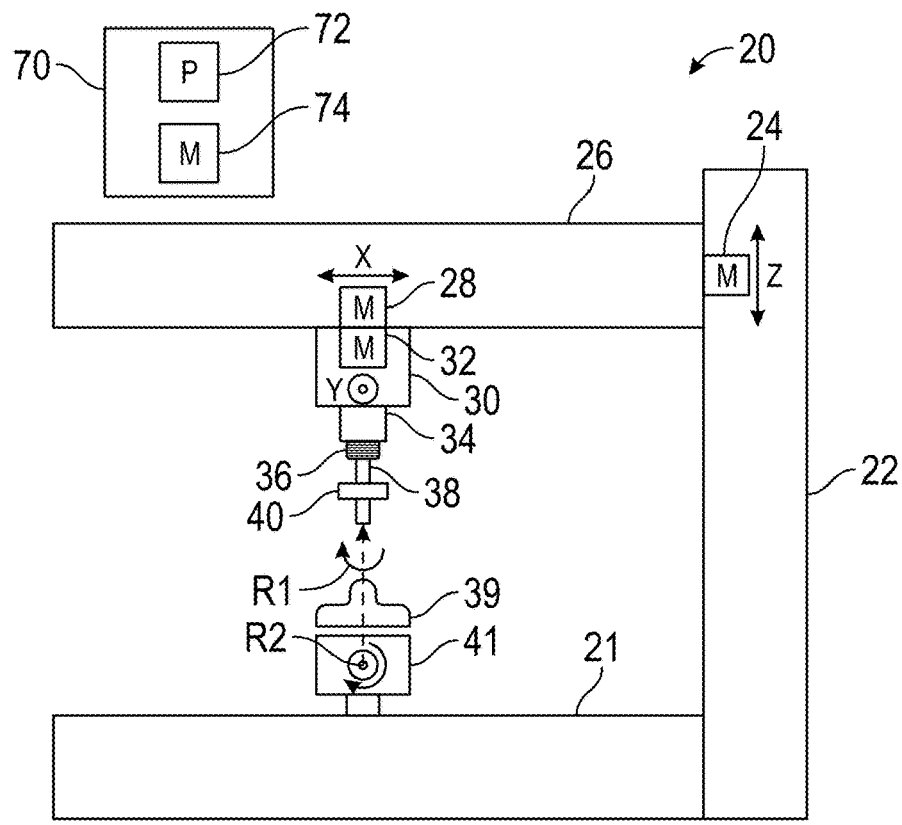
FIG. 1 is a schematic illustration of an example milling machine having a mill fan.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Those having ordinary skill in the art will recognize that terms such as "above," "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Referring to the FIGS., wherein like numerals indicate like parts referring to the drawings, wherein like reference numbers refer to like components, FIG. 1 shows a schematic view of a milling machine 20. The milling machine 20 allows for movement of a milling cutter, such as a tool 38 relative to a workpiece 39 on a workpiece support 41. In the illustrated example, the workpiece 39 is comprised of a clay-based material. One feature of milling a clay-based material is that the debris formed from the milling process can accumulate along a tool path of the tool 38 or become embedded in a finished surface of the workpiece 39. This impacts the surface quality of workpiece 39 and can lead to access tool wear. Additionally, a size of particles and volume of particles that accumulate can vary depending on a feed rate of the tool 38. Furthermore, this disclosing is application to milling workpieces comprised of materials other than clay, such as work or metal.

In the illustrated example, the milling machine 20 includes a frame 21 that supports the milling machine 20 on a floor surface. The milling machine 20 is configured to allow for movement of the tool 38 along an x-axis, a y-axis, and a z-axis. A vertical guidepost 22 includes a motor 24 that moves a horizontal cross bar 26 along the z-axis in a track that extends along the vertical guidepost 22. The horizontal cross bar 26 includes a motor 28 that moves a second cross bar 30 along the x-axis in a track that extends along the horizontal cross bar 26. Furthermore, a second horizontal cross bar 30 includes a motor 32 that moves the tool 38 along the y-axis in a track that extends along the second horizontal cross bar 30. This configuration of the milling machine 20 is generally referred to as a three-axis milling machine, i.e., x-axis, y-axis, and z-axis. However, the milling machine 20 can be configured to move the workpiece 39 along additional axes through manipulating the workpiece support 41, such as along at least one of a first rotational axis R1 vertically through the workpiece 39 or a second rotational axis R2 tilting the workpiece 39 as shown in FIG. 1. Utilizing these additional axes would allow the milling machine 20 to operate as a five-axis milling machine. Additionally, this disclosure applies to milling machines of other configurations.

The milling machine 20 includes a drive motor 34 that rotates the tool 38 at a predetermined rotational speed. The tool 38 is attached to the milling machine with a chuck 36, however, other types of fixation devices can be used to attach the tool 38 to the drive motor 34. A mill fan 40 is directly attached to the tool 38 such that the mill fan 40 rotates at the same rotational speed as the tool 38.

Furthermore, the milling machine 20 can be operated manually or through the use of an electronic controller 70. The electronic controller 70 can be disposed in communication with the motors 24, 28, 32, and 34 to control movement of the tool 38 along the x, y, and z axes. The electronic controller 70 may alternatively be referred to as a control module, a control unit, a controller, a computer, etc. The electronic controller 70 may include a computer and/or processor 72, and include software, hardware, memory, algorithms, etc., for managing and controlling the milling machine 20. As such, a method, described below and generally represented in FIG. 2, may be embodied as a program or algorithm partially operable on the electronic controller 70. It should be appreciated that the electronic controller 70 may include a device capable of executing the required tasks to control the operation of the milling machine 20.

The electronic controller 70 may be embodied as one or multiple digital computers or host machines each having one or more processors 72, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The electronic controller 70 includes a tangible, non-transitory memory 74 on which computer-executable instructions, including one or more algorithms, are recorded for regulating operation of the milling machine 20. The subject algorithm(s) may specifically include an algorithm configured to direct the milling machine 20 to follow a tool path for the tool 38 that results in formation of a finalized workpiece, as discussed in greater detail below with reference to method 100.

As shown in FIGS. 2-5, the mill fan 40 includes an attachment sleeve 42, a plurality of fan blades 48, and an outer sleeve 50. In the illustrated example, the attachment sleeve 42 is cylindrical and includes a radially inner surface 44 defining a tool contact surface for directly engaging the tool 38. The attachment sleeve 42 also includes a radially outer surface 46 having radially inner ends of the fan blades 48 extending radially outward therefrom. Axial ends of the attachment sleeve 42 may also include a standoff 47 that provides from the axial ends having a radially thickness that is less than a radially thickness of a central portion of the attachment sleeve 42. In this disclosure, radial or radially, axial or axially, longitudinal or longitudinally are relative to the axis A of rotation of the mill fan 40 unless stated otherwise.

The attachment sleeve 42 also includes a fastener opening 43 for accepting a fastener 45, such as a set screw. The fastener opening 43 is in the attachment sleeve 42 axially outward from an axial end of the outer sleeve 50 relative to the axis A.

Figure 2:
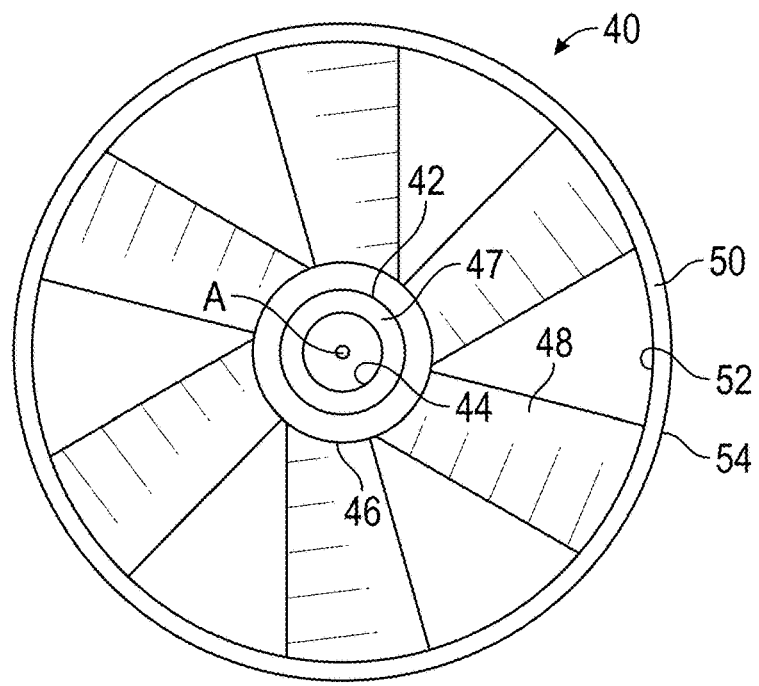
FIG. 2 is a schematic illustration of a top view of the mill fan of FIG. 1.
Figure 3:
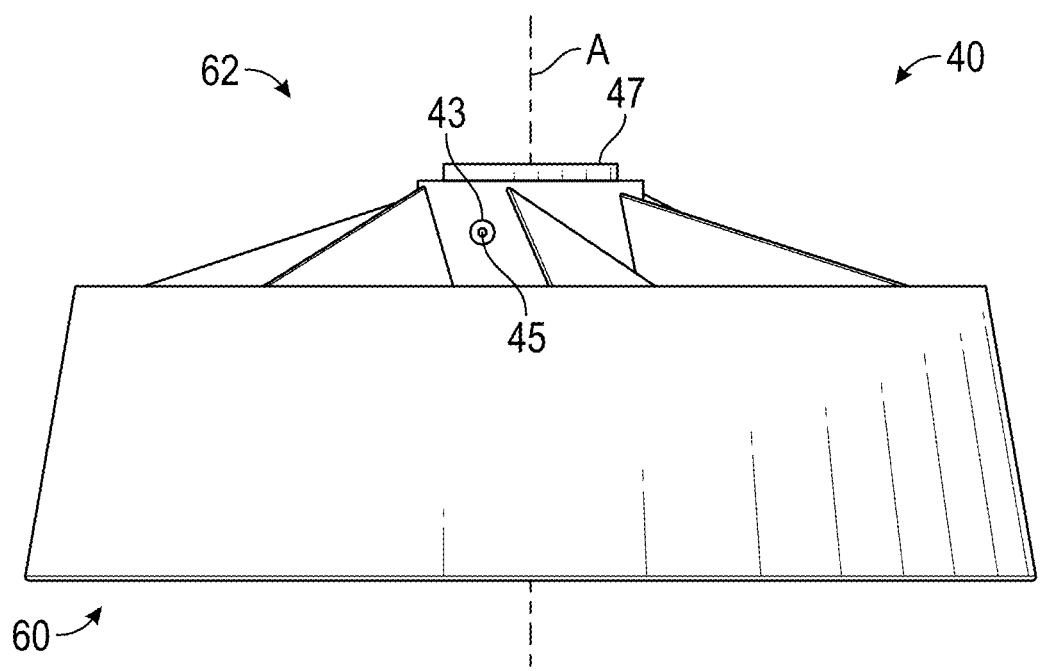
FIG. 3 is a schematic illustration of a side view of the mill fan of FIG. 1.

In the illustrated example, the fan blades 48 extend radially outward from a proximal or radially inner end of the fan blade 48 at the attachment sleeve 42 to a distal or radially outer end at the outer sleeve 50. As shown in FIG. 2, the fan blades 48 extend in a radial and circumferential direction such that the radial outer ends of the fan blades 48 are clocked relative to the radial inner ends of the fan blades 48.

Figure 4:
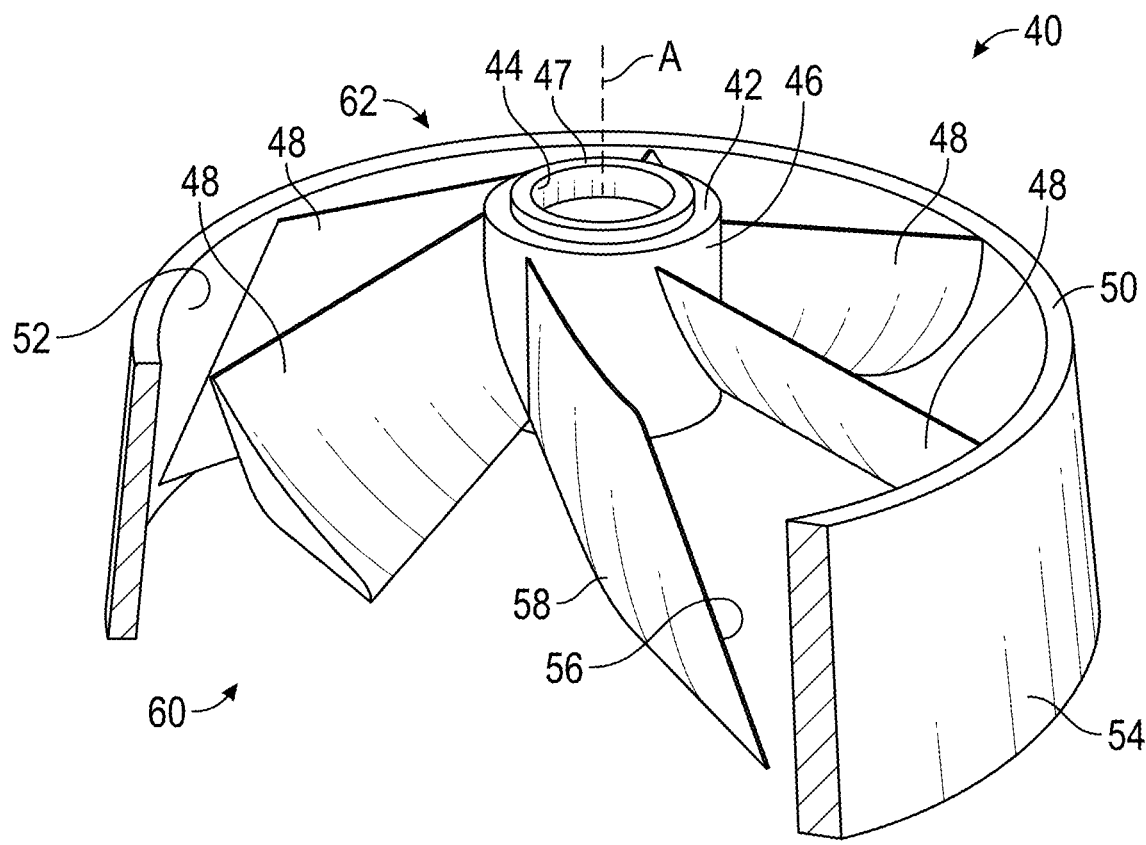
FIG. 4 is a schematic illustration of a top perspective cutaway view of the mill fan of FIG. 1.
Figure 5:
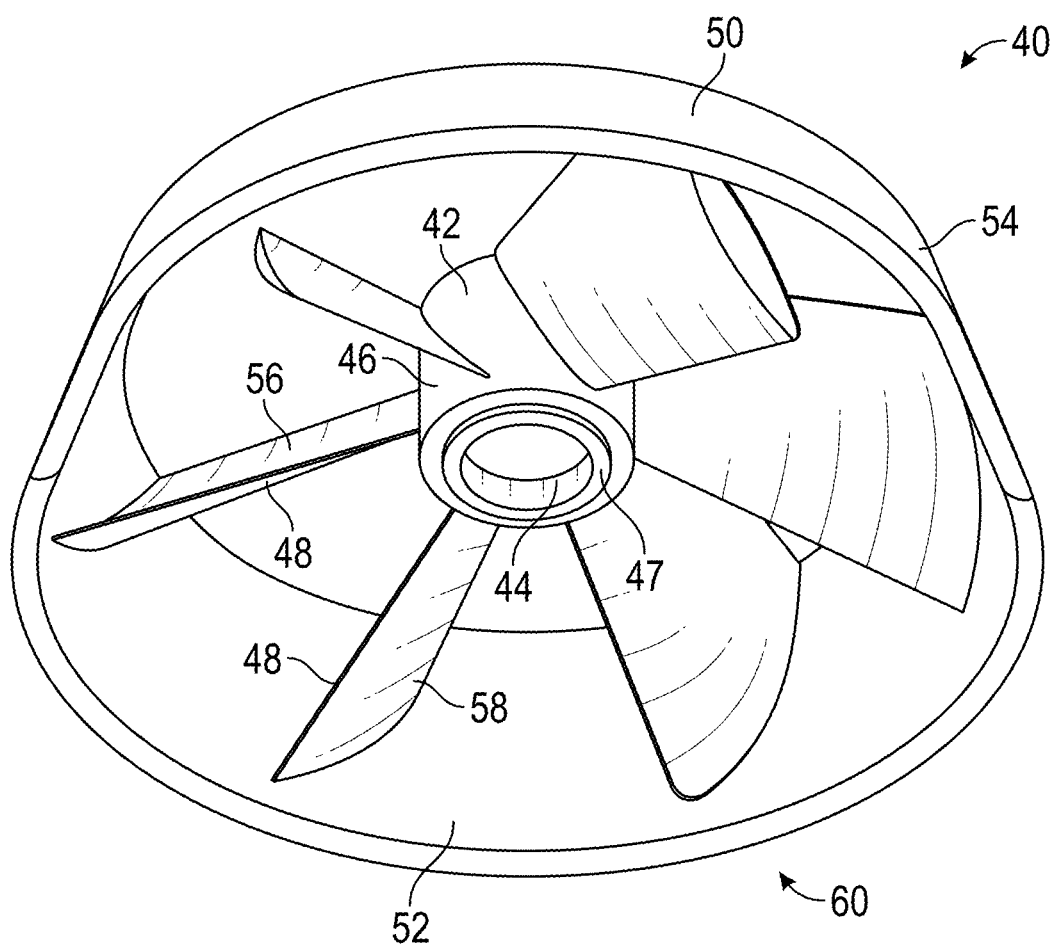
FIG. 5 is a schematic illustration of a bottom perspective cutaway view of the mill fan of FIG. 1.

Additionally, as shown in FIGS. 4-5, the fan blades include a pressure or concave side 56 that are opposite a suction or convex side 58. Furthermore, a chord length between a leading and trailing edge of each of the fan blades 48 at the radially inner or proximal end is less than a chord length at the radially outer or distal end of each of the fan blades 48. The attachment sleeve 42 also includes an axial length that is less than an axial length of the outer sleeve 50.

In the illustrated example, the outer sleeve 50 includes a radially inner surface 52 and a radially outer surface 54. The outer sleeve 50 includes a conical shape that tapers from an end adjacent to an inlet 60 of the mill fan 40 that draws air in while rotating to an outlet 62 that pushes air out of the mill fan 40. Furthermore, as shown in FIGS. 2 and 4-5, an upstream end of the attachment sleeve 42 adjacent to the inlet 60 is recessed into the outer sleeve 50 such that upstream ends of the attachment sleeve 42 and the outer sleeve 50 are at least partially axially offset relative to each other. Also, a downstream end of the attachment sleeve 42 protrudes axially past an axial end of the outer sleeve 50 at the outlet 62 such that the downstream ends of the attachment sleeve 42 and the outer sleeve 50 are at least partially axially offset relative to each other. In this disclosure, upstream and downstream are relative to a direction of flow of air through the mill fan 40 during normal operation that generates an airflow out of the outlet end 62 and over the tool 38. Additionally, the radial inner ends of the fan blades 48 are at least partially offset in a downstream direction relative to the radial outer ends of the fan blades 48.

Furthermore, an axial length of the attachment sleeve 42 is less than an axial length of the outer sleeve 50. Additionally, the attachment sleeve 42 is at least axially offset from the outer sleeve 50 by at least 50% of the axial length of the attachment sleeve 42, such that more than 50% of the axial length of the attachment sleeve 42 is spaced outward from one of the axial ends of the outer sleeve 50. Also, the radially inner ends of the fan blades 48 are partially axially offset outward from one of the axial ends of the outer sleeve 50.

Figure 6:
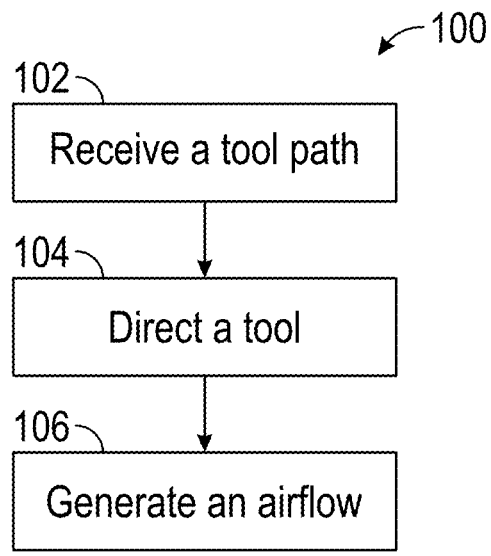
FIG. 6 is a flowchart of an example method of operating the milling machine of FIG. 1.

FIG. 6 illustrates an example method 100 of operating the milling machine 20 to form the workpiece 39 into a desired shape. The method 100 begins at block 102 by receiving a tool path with the electronic controller 70 representative of the desired shape to form with the workpiece 39. The method then proceeds to block 104.

At block 104, the electronic controller 70 directs the tool 38 to engage and selectively remove material from the workpiece 39 while following the tool path. In addition to directing the tool 38, the electronic controller 70 selects a rotational speed for the tool 38 based on at least one of a type of material of the workpiece 39 or a feed rate of the tool 38. This will allow the mill fan 40 to generate sufficient force to clear debris in a region of an intersection of the tool 38 and the workpiece 39. The method 100 then proceeds to block 106 with the mill fan 40 generating an airflow that removes debris generated by the tool 38 while the tool engages the workpiece 39. One feature of this configuration is that an additional power source is not required to generate the airflow as it is generated directly from the rotation of the tool.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

When an element such as a layer, film, region, or substrate is referred to as being "on" another element, it can be directly on the other element, or intervening elements may also be present. In contrast, when an element is referred to as being "directly on" another element, there are no intervening elements present.

Unless specified to the contrary herein, test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

What is claimed is:

1. A mill fan, comprising:
 a plurality of fan blades each having a radially inner end and a radially outer end, wherein the plurality of fan blades are configured to direct an airflow towards a distal end of a mill cutting tool;
 an attachment sleeve having a radially inner surface and a radially outer surface, wherein the radially inner surface includes a mill cutting tool contact surface and the radially outer surface is in engagement with the radially inner ends of the plurality of fan blades; and
 an outer sleeve connecting the radially outer ends of the plurality of fan blades, wherein the outer sleeve forms a ring, wherein the attachment sleeve is partially axially offset from the outer sleeve relative to an axis of rotation of the mill fan.

2. The mill fan of claim 1, wherein the outer sleeve includes a conical shape.

3. The mill fan of claim 1, wherein each of the plurality of fan blades extend outward from the attachment sleeve in a direction towards the outer sleeve having a radial component and a circumferential component.

4. The mill fan of claim 1, wherein the plurality of fan blades include a radially inner chord length adjacent the radially inner end of each of the plurality of fan blades that is less than a radially chord length adjacent the radially outer end of each of the plurality of fan blades.

5. The mill fan of claim 1, wherein the attachment sleeve extends a first axial length relative to the axis of rotation of the mill fan and the outer sleeve extends a second axial length relative to the axis of rotation of the mill fan with the second axial length being greater than the first axial length.

6. The mill fan of claim 1, wherein the attachment sleeve is at least partially offset from the outer sleeve by at least 50% of an axial length of the attachment sleeve.

7. The mill fan of claim 1, wherein the radially inner end of each of the plurality of fan blades are axially offset outward from an axial end of the outer sleeve relative to the axis of rotation of the mill fan.

8. The mill fan of claim 1, wherein the radially outer end of each of the plurality of fan blades are axially offset outward from an axial end of the attachment sleeve relative to the axis of rotation of the mill fan.

9. The mill fan of claim 1, wherein the attachment sleeve includes a fastener opening for accepting a fastener and the fastener opening is located axially outward from an axial end of the outer sleeve relative to the axis of rotation of the mill fan.

10. The mill fan of claim 1, wherein
the outer sleeve includes a conical shape;
each of the plurality of fan blades extend outward from the attachment sleeve in a direction towards the outer sleeve having a radial component and a circumferential component;
the plurality of fan blades include a radially inner chord length adjacent the radially inner end of each of the plurality of fan blades that is less than a radially chord length adjacent the radially outer end of each of the plurality of fan blades; and
wherein the attachment sleeve extends a first axial length relative to the axis of rotation of the mill fan and the outer sleeve extends a second axial length relative to the axis of rotation of the mill fan with the second axial length being greater than the first axial length.

11. A milling machine, comprising:
a drive motor in driving engagement with a spindle;
a tool attached to the spindle and configured to rotate with the spindle;
a mill fan attached to the tool and configured to rotate with the tool, the mill fan including:
a plurality of fan blades each having a radially inner end and a radially outer end, wherein the plurality of fan blades are configured to direct an airflow towards a distal end of a mill cutting tool;
an attachment sleeve having a radially inner surface and a radially outer surface, wherein the radially inner surface includes a mill cutting tool contact surface and the radially outer surface is in engagement with the radially inner ends of the plurality of fan blades; and
an outer sleeve connecting the radially outer ends of the plurality of fan blades, wherein the outer sleeve forms a ring, wherein the attachment sleeve is partially axially offset from the outer sleeve relative to an axis of rotation of the mill fan.

12. The milling machine of claim 11, wherein the outer sleeve includes a conical shape.

13. The milling machine of claim 11, wherein each of the plurality of fan blades extend outward from the attachment sleeve in a direction towards the outer sleeve having a radial component and a circumferential component.

14. The milling machine of claim 11, wherein the plurality of fan blades include a radially inner chord length adjacent the radially inner end of each of the plurality of fan blades that is less than a radially chord length adjacent the radially outer end of each of the plurality of fan blades.

15. The milling machine of claim 14, wherein the attachment sleeve extends a first axial length relative to the axis of rotation of the mill fan and the outer sleeve extends a second axial length relative to the axis of rotation of the mill fan with the second axial length being greater than the first axial length.

16. The milling machine of claim 11, wherein the attachment sleeve extends a first axial length relative to the axis of rotation of the mill fan and the outer sleeve extends a second axial length relative to the axis of rotation of the mill fan with the second axial length being greater than the first axial length.

17. The milling machine of claim 11, wherein the attachment sleeve includes a fastener opening for accepting a fastener and the fastener opening is located axially outward from an axial end of the outer sleeve relative to the axis of rotation of the mill fan.

18. The milling machine of claim 11, wherein
the outer sleeve includes a conical shape;
each of the plurality of fan blades extend outward from the attachment sleeve in a direction towards the outer sleeve having a radial component and a circumferential component;
the plurality of fan blades include a radially inner chord length adjacent the radially inner end of each of the plurality of fan blades that is less than a radially chord length adjacent the radially outer end of each of the plurality of fan blades; and
wherein the attachment sleeve extends a first axial length relative to the axis of rotation of the mill fan and the outer sleeve extends a second axial length relative to the axis of rotation of the mill fan with the second axial length being greater than the first axial length.

19. The milling machine of claim 11, wherein the attachment sleeve is at least partially offset from the outer sleeve by at least 50% of an axial length of the attachment sleeve.

20. A method of operating a milling machine to form a workpiece, the method comprising:
receiving a tool path representative of a component with a controller;
directing a mill cutting tool to engage and selectively remove material from the workpiece while following the tool path;
generating an airflow with a mill fan in a region of intersection of the mill cutting tool and the workpiece to clear debris from the tool path by selecting a rotational speed for the mill cutting tool based on a material of the workpiece and a feed rate of the mill cutting tool, wherein the mill fan includes:
a plurality of fan blades configured to direct the airflow towards a distal end of the mill cutting tool;
an attachment sleeve having a radially inner surface and a radially outer surface, wherein the radially inner surface includes a mill cutting tool contact surface in direct contact with the milling cutting tool and radially inner ends of the plurality of fan blades extend radially outward from the radially outer surface of the attachment sleeve; and
an outer sleeve connecting distal ends of the plurality of fan blades, wherein the outer sleeve forms a ring, wherein the attachment sleeve is partially axially offset from the outer sleeve relative to an axis of rotation of the mill fan.

* * * * *